April 14, 1970            E. H. LAND            3,506,333
PROTECTIVE FILTER COMBINATION FOR INTENSE LIGHT FLASHES
Filed Jan. 19, 1967
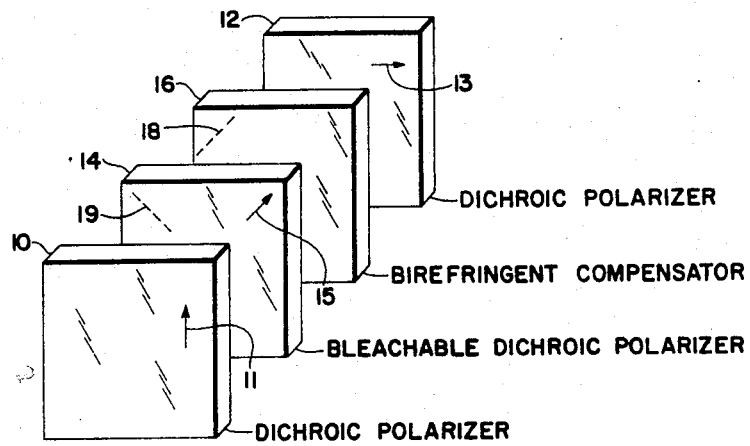
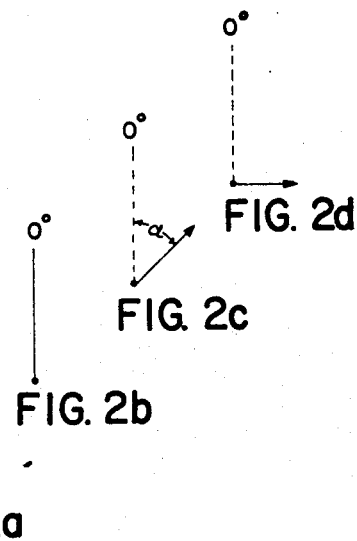
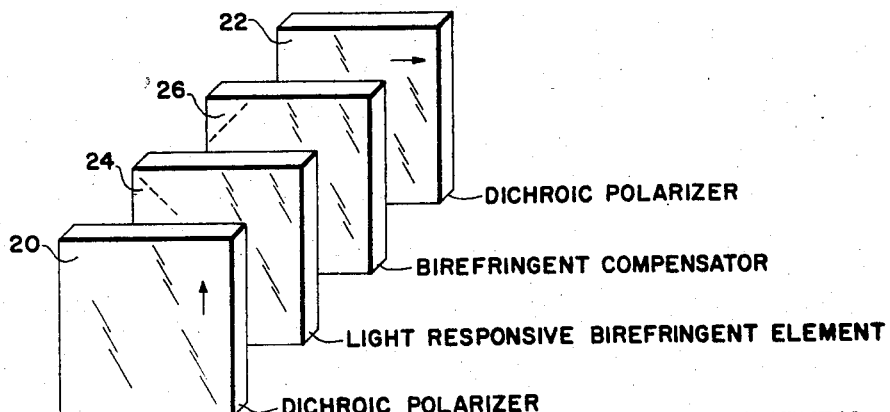
INVENTOR.
Edwin H. Land
BY Brown and Mikulka
and
William D. Roberson
ATTORNEYS

United States Patent Office 3,506,333
Patented Apr. 14, 1970

3,506,333
PROTECTIVE FILTER COMBINATION FOR INTENSE LIGHT FLASHES
Edwin H. Land, Cambridge, Mass., assignor to Polaroid Corporation, Cambridge, Mass, a corporation of Delaware
Filed Jan. 19, 1967, Ser. No. 610,382
Int. Cl. G02b 5/30
U.S. Cl. 350—157   12 Claims

ABSTRACT OF THE DISCLOSURE

A variable density filter which darkens in response to an intense flash of light incorporates a series of three dichroic polarizers arranged on a common optical path. The first and third polarizers are positioned with their axes orthogonal such that, without the interposition of the second polarizer between them, they would exhibit a high optical density. The second or intermediate polarizer with its axis at some angle other than 90° to those of the other polarizers causes the combination to be transmissive. The second polarizer, unlike the other polarizers, is readily bleached by the absorption of high radiant energies. A flash of light of sufficient intensity to bleach the second polarizer and thereby to destroy its dichroic properties causes an increased opacity or density to be exhibited by the filter combination.

---

This invention relates to variable density filter constructions which vary their light transmission characteristics automatically in response to incident light or other radiation, and more particularly to filter constructions which are substantially unaffected by normal light levels but which, in response to brilliant flashes of light, exhibit an almost instantaneous increase in optical density.

Filter constructions of the type contemplated by this invention may be employed in goggles, visors, windows, or the like to permit relatively normal vision at ambient light levels while providing protection of the vision against the blinding effects of sudden and unexpected flashes of intense light.

A primary object of this invention is the provision of a novel filter combination employing a train of light polarizing elements capable of substantally extinguishing light passing therethrough and at least one additional element which, by a change in its physical properties induced by intense illumination, alters the polarization form of light passing through the filter combination from a relatively transmissible form to a form which is substantially blocked.

Another object of this invention is to provide a unique filter combination in which increased attenuation characteristics of the filter combination result from a decrease in the light attenuation characteristics of certain optical materials under the influence of intense radiation. Stated differently, an object of the invention is to provide a photoresponsive filter combination in which an increased opacity of the filter combination results from decreased dichroism of at least one component of the combination.

This invention makes use of dichroic light polarizing materials and one of the features and objects of the invention resides in the use of a combination of dichroic light polarizing elements, the transmissivity of which combination depends upon the dichroic characteristics of the elements, the dichroic characteristics changing under the influence of increased light levels.

The invention also has as an object the provision of a filter combination including light polarizer elements and at least one birefringement element having the capability of changing its birefringence under the influence of intense illumination, thereby changing the transmissivity of the filter combination.

By way of a brief summary, one exemplary form of the invention comprises a pair of linear dichroic sheet polarizers having a high resistance to the bleaching effects of intense illumination and possessing a high dichroic ratio. These elements are arranged sequentially along a single optical path with their transmission axes crossed at 90° such that, with no further modification of the combination, almost all light along the optical path would be attenuated by the two polarizers. Between these two crossed polarizers a still further dichroic polarizer of somewhat different characteristics is installed with its transmission axis aligned with neither of those of the other polarizers. For example, the intermediate polarizing element may have its axis at 45° to both of the other axes. The introduction of the additional polarizer causes the overall combination to be transmissive of a large proportion of the light intercepted by the filter combination. The importance of the additional polarizing element resides in its characteristic of rotating the polarization azimuth of light intercepted thereby and its ability to alter this characteristic under the influence of intense illumination passing through one of the first-mentioned polarizers.

In this form of the invention the intermediate polarizing element, which need not have as high a dichroic ratio as those of the other two polarizers, is deliberately selected from a class of polarizers which are bleached by intense illumination. For this particular filter combination to transmit a substantial amount of light in normal use, it is necessary for the dichroic ratio of the internal polarizing to be substantially greater than one. If the dichroic ratio is reduced to one, the internal polarizer functions merely as an additional light transmitting element of the combination. The other two polarizers then effectively block almost all light therethrough. However, the dichroic ratio of the intermediate polarizer depends upon the absorption characteristics of the dichromophore incorporated therein. Any bleaching of the dichromophore in the intermediate polarizing element automatically reduces the dichroic ratio of that element and, thereby, reduces the transmission of the filter combination. For this reason the intermediate polarizing element is deliberately selected from a class of polarizers which bleach, that is, which exhibit a reduction in dichroic ratio under the influence of intense radiation. Thus, in a very real sense it can be said that the opacity of the overall combination of elements becomes greater as one of the elemenst becomes more transparent.

Further details of the invention and some of its illustrative embodiments will be more clearly understood in connection with the following detailed description taken together with the drawings wheerin:

FIGURE 1 is a diagrammatic representation of an illustrative embodiment of the invention;

FIG. 2 is a simplified vector representation of the polarization characteristics of light as it passes through various stages of the filter combination of FIGURE 1; and FIG. 3 is a diagrammatic representation of an additional illustrative embodiment of the invention.

In FIGURE 1 is shown an optical filter combination comprising several optical elements arranged along a single optical path. These elements, diagrammatically represented as spaced elements arranged in a single line, are shown thus for purposes of clarity although it should be understood that their actual arrangement, whether as a sandwiched integral structure or as spaced components of a larger optical system including lenses, mirrors, and the like, is a matter of choice. In this drawing a first polarizing means is represented by a dichroic sheet polarizer 10 having a vertical transmission axis represented by arrow 11. Polarizer 10 is of a type which is highly resistant to the bleaching effects of intense illumination and which exhibits a high dichroic ratio. Preferably, polarizer 10 may take the form of a polarizing material known commercially as K-sheet and which is available from Polaroid Corporation in Cambridge, Massachusetts. K-sheet polarizers are made by dehydrating stretched polyvinyl alcohol as described, for example, in U.S. Patent 2,445,555 which issued July 20, 1948, to F. J. Binda. The resulting dichromophore is polyvinylene. K-sheet can withstand high temperatures and high radiation levels without decomposition and its characteristics are therefore quite stable. The last-shown polarizing means in the optical system may also be supplied by polarizer 12 formed of a stable polarizing material such as K-sheet and arranged with its transmission axis, as represented by the arrow 13, oriented at an angle of 90° with respect to the transmission axis of polarizer 10. With no further elements in the system, polarizers 10 and 12 would effectively block all light along the optical path.

Between polarizing elements 10 and 12 there is introduced a still further polarizing means represented in the illustrated example by a dichroic polarizing element 14 and a transparent, optically active element, the purpose of which will be discussed below. The transmission axis 15 of polarizer 14 is oriented at an angle which is neither parallel with nor perpendicular to the transmission axes of polarizers 10 and 12. By its presence in the system, the intermediate polarizer 14 renders the filter combination transmissive to a high proportion of the light intercepted thereby. If intermediate polarizer 14 were aligned with its transmission axis 15 parallel to the polarization azimuth of the light which it receives from polarizer 10, it would exert no significant influence on that light. If on the other hand its transmission axis were arranged at 90° to the polarization azimuth, polarizer 14 would substantially block the passage of light therethrough. At an intermediate angle polarizer 14 behaves as an optically active rotator of polarized light.

These facts may be more readily perceived with reference to the idealized vector representations of FIGS. 2a, 2b, 2c, and 2d. FIG. 2a is a conventional representation of the unpolarized or, more properly speaking, randomly polarized light intercepted by first polarizer 10. FIG. 2b represents the polarization vector of light emerging from dichroic polarizer 10. This vector is parallel to the transmission axis of the polarizer. For convenience of designation, it will be assumed that the polarized light passed by polarizer 10 has a polarization azimuth of 0°. This polarized light in passing through intermediate polarizer 14 undergoes a change which alters its polarization azimuth and amplitude, emerging from polarizer 14 with a polarization vector as represented by FIG. 2c. The amplitude of the latter polarization vector is reduced and the azimuth is shifted through an angle $\alpha$ which depends on the dichroic ratio of polarizer 14 as well as upon the angle between its transmission axis and that of polarizer 10.

Because of the changed polarization azimuth of light emerging from polarizer 14, a very substantial proportion of this light is capable of being transmitted by polarizer 12; the polarity and amplitude of this transmitted component is represented by the vector in FIG. 2d. Because of the aforesaid high dichroic ratio of polarizer 12, the polarization azimuth of light emerging therefrom is substantially parallel to the transmission axis of polarizer 12, that is, at an indicated azimuth of 90°.

It is important to note that without the vector rotation represented by the angle $\alpha$ in FIG. 2c and induced by polarizer 14, substantially no light would be transmitted through polarizer 12. The filter combination would be practically opaque. The vector rotation induced by polarizer 14 depends not only on the angularity of its transmission axis, but also upon its dichroic ratio. The dichroic ratio is in turn directly related to the optical density of polarizer 14 with respect to the unwanted component of light polarized orthogonally to its transmission axis, the dichroic ratio being defined simply as the ratio between the major and minor optical densities of a dichroic polarizer.

Any decrease in the minor axis density reduces the dichroic ratio of polarizer 14 and causes a corresponding decrease in the vector angle $\alpha$ represented in FIG. 2c, tending to rotate the resulting polarization azimuth back toward 0°. While a reduction in the dichroic ratio may result in an increase in the absolute amplitude of the FIG. 2c vector, it also rotates that vector and produces a corresponding reduction in the amplitude of the vector represented by FIG. 2d. The effect is to increase the optical density of the filter combination.

In the practice of the invention, the intermediate polarizer 14 is preferably selected from a type which, while normally stable with respect to ordinary ambient light levels, exhibits a bleaching effect when exposed to intense illumination even for short intervals. The intermediate polarizer means must be more sensitive to the effects of intense illumination, since it receives and must respond to light already attenuated and polarized by its passage through the first polarizer means. One such type of polarizer is known commercially as H-sheet and is available from Polaroid Corporation in Cambridge, Massachusetts. H-sheet is the name given a sheet polarizer which comprises an oriented or stretched film of linear polyvinyl alcohol incorporating a dichromophore resulting from an iodine stain, as described, for example, in U.S. Patent 2,554,850 which issued May 29, 1951, to F. J. Binda. H-sheet is normally considered very stable with respect to typical ambient illumination, as evidenced by its widespread use in sunglasses. Nevertheless, such a polarizer may be bleached by intense illumination incident thereon over short intervals, even though the same total energy striking the polarizer over a longer interval may produce no discernible bleaching effects.

The bleaching effect reduces the ability of the polarizer to absorb the so-called unwanted component of light, i.e., that component having a polarity perpendicular to the transmission axis, and thus reduces the dichroic ratio of the polarizer. Consequently, the decreased dichroic ratio of polarizer 14, induced almost instantaneously by an intense flash of light and evidenced by an increased transmissivity of this one polarizer, decreases the overall transmissivity of the filter combination.

Other effects may become significant upon the bleaching of polarizer 14. One such effect is the birefringence generally exhibited by dichroic polarizers. The birefringence of dichroic polarizers is commonly ignored since it does not affect the transmittance of two polarizers for initially unpolarized light. It does, however, affect the state of polarization of the light emerging from a train of two polarizers and may result in elliptical polarization characteristics differing with wavelength. To compensate for the birefringence exhibited by polarizer 14, an optically active birefringent element 16 may be introduced into the filter assembly as shown in FIGURE 1. The element 16 may be formed by a sheet of stretched or oriented birefringent polymer in all respects identical to that used in the formation of polarizer 14, except for the omission of the staining agent which would render it dichroic and polarizing. Element 16 should be oriented with its stretch axis indicated by dashed line 18 transverse to the stretch axis 19 of the polymer film employed in polarizer 14. In this way the birefringence of element 16 is equal and opposite in its effects to the birefringence of element 14. The combination of polarizer 14 and the optically active element 16, which can be laminated together as a single element, may be considered to constitute a dichroic polarizer compensated to possess little or no birefringence.

In the practice of this invention a photoresponsive member of the filter combination undergoes a physical change of characteristics which causes a variable rotation of the polarization azimuth of polarized light passing therethrough, thereby varying the density of the filter combination. In the illustrative embodiment of FIGURE 1 the photoresponsive element exhibits both dichroism and birefringence. However, the property primarily responsible for controlling the transmissivity of the combination is the variable dichroism. The birefringence is a characteristic which, in the first embodiment, is merely incidental. This invention may also be practiced in connection with a filter combination in which the primary transmission-controlling property is that of variable birefringence resulting from a light-induced physical change in an element of the combination.

An example of this is shown in FIG. 3. Therein the entrance element 20 and the exit element 22 are preferably provided, as in the previous example, by dichroic sheet polarizers having relatively high dichroic ratios and exhibiting special resistance to any diminution of their polarizing properties upon exposure to intense illumination. As in the previous example the entrance and exit elements 20 and 22 may be provided by K-sheet polarizers. The second illustrated element of the filter combination of FIG. 3 is an optically active birefringent element 24 possessing the characteristic of altering its birefringence upon exposure to intense illumination.

Element 24 may have a form very much analogous to the intermediate dichroic polarizer in the first example. It may be formed by brominating a sheet of previously oriented polyvinyl alcohol with a saturated aqueous solution of molecular bromine containing a half-molar concentration of sodium bromide. After treating the polyvinyl alcohol with such a solution for a period of from one to five minutes, washing the treated film with a three percent boric acid solution, and drying, the film exhibits a yellowish cast. The bromination evidenced by the yellow hue results in a higher degree of birefringence than that which the sheet of untreated but oriented polyvinyl alcohol had possessed previous to the treatment.

Such a brominated film actually possesses some dichroic characteristics particularly with respect to ultraviolet radiation. It is, however, highly transmissive in the visible portions of the spectrum, possessing a much lower density than that of the H-sheet in the previous example. Consequently, at normal ambient radiation levels to which the brominated sheet is highly stable a substantially greater proportion of light passes through element 24. In passing through element 24, however, the polarization azimuth of the transmitted light is caused to shift because of the birefringent properties of that element. A shift similar to that illustrated by the polarization vector of FIG. 2c takes place, except that the amplitude of the vector is larger due to the decreased absorption of visible light. Here the birefringent properties, rather than the dichroic properties, are principally responsible for the rotation of the polarization azimuth of light received from entrance polarizer 20.

Upon exposure through entrance polarizer 20 to intense illumination exceeding a particular level sufficient energy is absorbed by element 24 to cause a substantial reduction in its birefringent properties, although the yellowish cast responsible for its optical density may not be noticeably altered.

The natural birefringence of oriented polyvinyl alcohol is not achromatic. That is, it acts unequally on different wavelengths of light. To correct for this natural birefringence of the polyvinyl alcohol in the optically active element 24, an additional active element 26 is introduced formed of oriented unstained polyvinyl alcohol with its stretch axis arranged transverse to the stretch axis of element 24. The birefringence exhibited by element 26 is introduced not to eliminate the birefringence introduced by the intermediate element 24, but to compensate for the remaining birefringence which element 24 exhibits after its properties have been altered by exposure to intense radiation levels. Before exposure of the filter combination to intense radiation levels, the combination is transmissive to a high degree of the illumination intercepted thereby. It is in fact more transparent than the example illustrated in FIGURE 1 because of the reduced dichroism or absorption of the photoresponsive element. This is one of the advantageous features of the combination shown in FIG. 3. The light transmitted by the optical elements of both illustrated filter systems undergoes a certain attenuation in passing through the entrance, intermediate and exit elements even under normal ambient illumination when the second element of the combination is unaffected by the intensity of the illumination. In use, the first illustrated embodiment possesses initial optical properties which resemble those of a fairly dark, neutral density sunglass. The second illustrated example, on the other hand, because it absorbs less visible light in the photoresponsive element, possesses a substantially lower optical density. In those cases where it is desirable to preserve a relatively high level of visibility through the filter combination under ambient illumination conditions, the latter embodiment may be considered preferable.

From the foregoing it will be seen that different types of photoresponsive mechanisms may be employed for the purpose of altering the polarization form of light passing through the filter combination from a relatively transmissible form to a form which is highly attenuated by the filter combination. It should also be appreciated that the invention is not limited to the particular forms of polarizers and optically active elements which have been described specifically in connection with the illustrated examples. These examples are representative of a wide variety of materials and optical elements which may be employed in the practice of the invention.

What is claimed is:

1. A variable filter combination exhibiting increased optical density in response to the incidence thereon of illumination exceeding a predetermined level of intensity comprising in sequence along a common optical path:
   a first means for polarizing light intercepted by said filter assembly;
   second means for optically altering the polarization form of light passed by said first means, said second means including a photoresponsive light transmissive member intrinsically responsive to intense illumination passing through said filter combination for reducing the amount by which the polarization form of light is altered by said second means; and
   third means for polarizing light received from said second means and arranged to transmit only polarized light components having a form orthogonal to the polarization form of light transmitted by said second means after the response of said light transmissive member to said intense illumination.

2. A variable filter combination exhibiting increased optical density in response to brilliant illumination comprising at least three optical elements arranged in sequence along a common optical path,
   the first of said elements being constituted by light polarizing means of a type resistant to change of its polarizing properties under the influence of intense illumination for converting light incident thereon along said optical path to a first polarized form,
   the second of said elements comprising polarizing form-altering means having the characteristic of altering to a second polarized form the polarized light incident thereon along said optical path from the aforesaid polarizing means, said second element having the property of changing its polarization form-altering characteristic under the influence of relatively intense illumination incident thereon, thereby varying the polarization form of light transmitted thereby, the third of said elements being constituted by light polarizing means normally transmitting a substantial component of light having said second polarized form, but arranged to transmit substantially only forms of polarized light orthogonal to the polarized form of light transmitted by said second element after said characteristic of said second element has been changed by intense illumination, said last-mentioned polarizing means being of a type resistant to change of its polarizing properties under the influence of intense illumination.

3. The filter combination of claim 2 wherein the polarization form-altering means of the second of said elements includes a light transmissible member which exhibits a net birefringence after its characteristics are changed by intense illumination and further comprises an additional light transmissible member exhibiting a degree of birefringence equal and opposite in its effects to the net birefringence of said first-mentioned member to cancel the birefringent influence of the second of said elements on light transmitted to the third of said elements after the change in characteristic of said second element in response to intense illumination.

4. A variable filter combination exhibiting increased optical density in response to the incidence thereon of illumination exceeding a predetermined level of intensity comprising in sequence along a common optical path:
first means for linearly polarizing light intercepted by said filter assembly;
second means for optically rotating the polarization azimuth of light passed by said first means, said second means including a photoresponsive light transmissive member intrinsically responsive to intense illumination passing through said filter combination for reducing the amount by which the polarization azimuth of light is rotated by said second means; and
third means for linearly polarizing light received from said second means and having its transmission axis arranged orthogonally to the polarization azimuth of light transmitted by said second means after the response of said light transmissive member to said intense illumination.

5. The filter combination of claim 4 wherein said first and third means each comprises a linear dichroic polarizer of a type relatively resistant to alteration of its polarizing properties under the influence of illumination sufficiently intense to alter the azimuth-rotating properties of said photoresponsive member.

6. The filter combination of claim 5 wherein said photoresponsive member comprises a linear dichroic polarizer having its transmission axis at an angle other than 0° or 90° to that of said first means and exhibiting a reduced dichroic ratio in response to said intense illumination.

7. The filter combination of claim 5 wherein said photoresponsive member comprises a birefringent element exhibiting a reduced birefringence in response to said intense illumination.

8. The filter combination of claim 5 wherein said photoresponsive member exhibits a net birefringence after response of said member to said intense illumination and wherein said second means further includes a birefringent compensator element exerting an equal but opposite birefringent effect on light transmitted by said photoresponsive member after response thereby to said intense illumination.

9. A variable density filter combination exhibiting increased optical density in response to brilliant illumination comprising in sequence along a common optical path:
first dichroic polarizing means of a bleach-resistant variety acting on light incident thereon to transmit at least a portion of one of two mutually orthogonal polarized components thereof and to reject substantially all of the other of said components;
second dichroic polarizing means of a bleachable variety having a polarization axis arranged at an angle of other than 0° or 90° with respect to the polarization azimuth of said one component thereby altering the polarization azimuth of light transmitted thereby, the dichroic characteristics of said second polarizing means being capable of substantial destruction by intense illumination to permit polarized light to pass therethrough with a substantially unaltered polarization azimuth; and
third dichroic polarizing means of a bleach-resistant variety having a polarization axis arranged to reject substantially all of the illumination passed by said second polarizing means when the dichroic characteristics thereof have been destroyed.

10. A variable density filter combination exhibiting increased optical density in response to brilliant illumination comprising in sequence along a common optical path:
first polarizing means of a bleach-resistant variety acting on light incident thereon to transmit at least a portion of one of two mutually orthogonal linearly polarized components thereof and to reject substantially all of the other of said components;
photoresponsive birefringent means intercepting light from said first polarizing means and arranged to alter the polarization azimuth of light transmitted thereby, the birefringence of said photoresponsive means being capable of substantial reduction by intense illumination to permit polarized light from said first polarizing means to pass therethrough with a substantially unaltered polarization azimuth; and
second polarizing means of a bleach-resistant variety having a transmission axis arranged to reject substantially all of the illumination passed by said means when the birefringence thereof has been reduced.

11. A variable density filter combination exhibiting increased optical density in response to brilliant illumination comprising:
first, second and third dichroic polarizing means positioned serially along a common optical path,
said first and third dichroic polarizing means being of a type resistant to reduction of their dichroic ratios upon exposure to intense illumination,
said second dichroic polarizing means being oriented with its transmission axis at an angle of other than 0° and 90° with respect to the polarization azimuth of light incident thereon from said first polarizing means, thereby transmitting a major proportion of such incident light with an altered polarization azimuth;
said second dichroic polarization means having the property of exhibiting a reduced dichroic ratio upon exposure to intense illumination, whereupon the polarization azimuth of light transmitted thereby approaches the polarization azimuth of light intercepted thereby,
said third polarizing means being oriented with its transmission axis at such an angle with respect to the polarization azimuth of light incident thereon from said second polarizing means that any reduction in the dichroic ratio of said second polarizing means reduces the amount of light transmitted by said third polarizing means.

12. A variable density filter combination exhibiting increased optical density in response to brilliant illumination comprising:
first, second and third light transmissible means positioned serially along a common optical path,
said first and third means comprising dichroic linear polarizers resistant to reduction of their dichroic ratios upon exposure to intense illumination,
said second means comprising a photoresponsive birefringent material arranged with respect to the polarization azimuth of light incident thereon from said first means to transmit a major component of such incident light with an altered polarization azimuth, said second means having the property of exhibiting a reduced birefringence upon exposure to intense illumination, whereupon the polarization azimuth of light transmitted thereby approaches the polarization azimuth of light intercepted thereby, said third means being oriented with its transmission axis at such an angle with respect to the polarization azimuth of light incident thereon from said second means that any reduction in the birefringence of said second means reduces the amount of light transmitted by said third polarizing means.

References Cited

UNITED STATES PATENTS 3,153,146 10/1964 Lady.
3,266,370 8/1966 Marks et al.

FOREIGN PATENTS 936,788 9/1963 Great Britain.

DAVID SCHONBERG, Primary Examiner

P. R. MILLER, Assistant Examiner

U.S. Cl. X.R.

350—147, 154, 156, 160